United States Patent Office 2,975,280
Patented Mar. 14, 1961

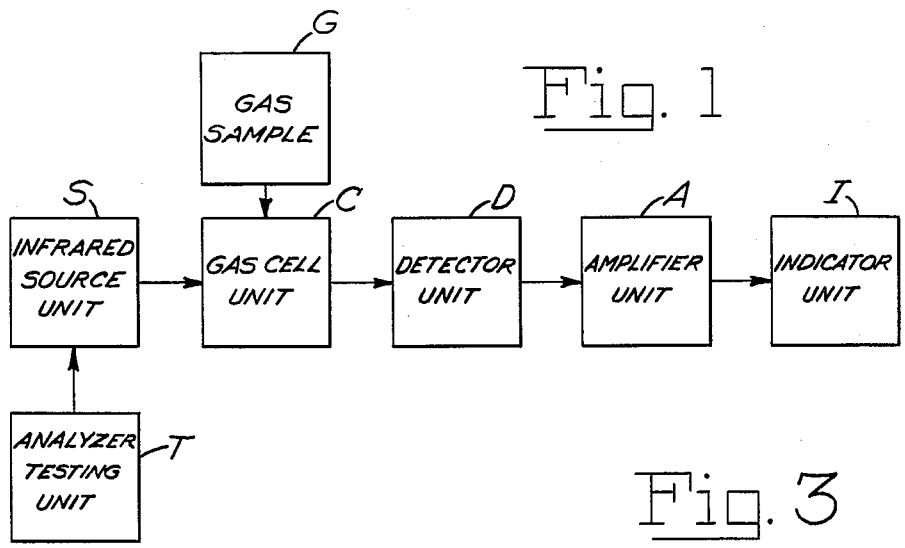
Fig. 1
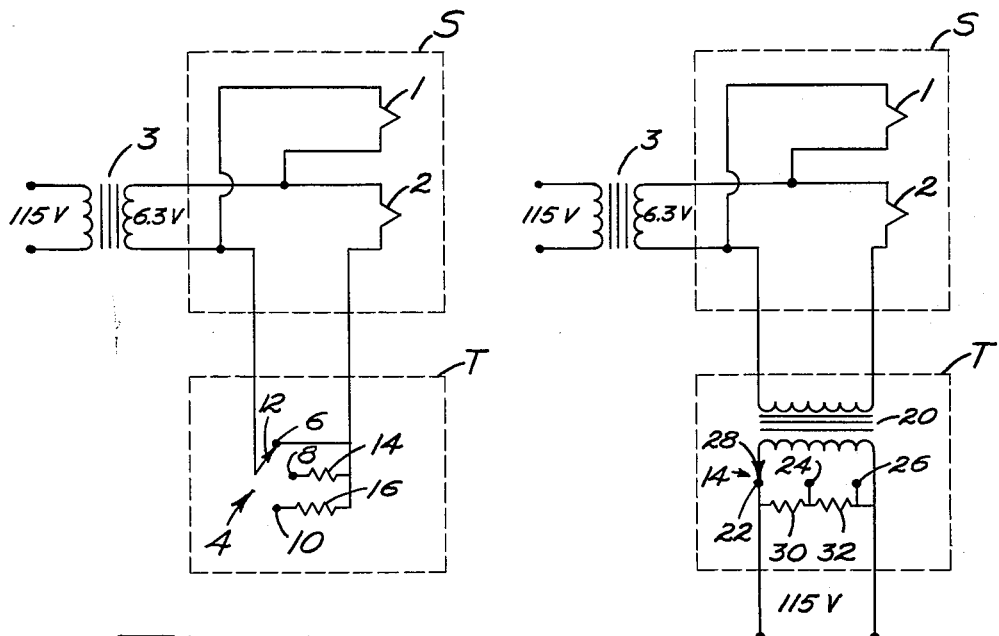
Fig. 3
Fig. 2
INVENTOR.
JAMES L. WATERS

2,975,280
APPARATUS FOR THE ANALYSIS OF MIXTURES

James L. Waters, Framingham, Mass., assignor to Mine Safety Appliance Company, Pittsburgh, Pa., a corporation of Pennsylvania Filed Mar. 21, 1957, Ser. No. 647,705

2 Claims. (Cl. 250—43.5)

This invention relates to an apparatus for the analysis of mixtures, and more particularly to an infrared apparatus having electrical means for testing the apparatus to determine its operational efficiency.

The invention is applicable to, and is herein illustrated as embodied in, gas analysis apparatus where infrared radiation is caused to travel along two paths and is caused to traverse the cell containing the gas to be analyzed in one of said paths, and wherein the gas in said analysis cell affects the relative intensity of the beams. The gas is ordinarily continuously passed through said analysis cell. An advantageous mode of analysis of this type is described in my co-pending application Serial No. 403,525, now Patent No. 2,802,109, filed January 12, 1954.

In this type of apparatus, it is desirable to provide a means for testing the complete apparatus to determine its operational efficiency at any given moment. One method of testing an infrared analyzer is to substitute a known gas sample for the sample gas stream and checking the analyzer indicator to determine whether a proper reading is obtained. The analyzer, of course, is precalibrated so that readings on the indicator are predetermined for known samples of gas. This type of testing, however, is costly and time consuming if the required accuracy is maintained since it is difficult to produce a known gas sample without human error. Further, considerable apparatus including the sample cylinders of gases, tubing, valves, etc. is required. Electrical apparatus have been devised for the testing of single components of an analyzer, but such testing devices check only the single components and do not check the entire apparatus.

Accordingly, it is an object of this invention to provide an analyzer having electrical means for testing the entire apparatus. Another object is to provide an analyzer with a testing device which is simple and inexpensive, and easily operated. It is a further object of this invention to provide an infrared analyzer with an electrical device which will test the operational efficiency of the analyzer.

Other objects and advantages will become apparent from the following description and annexed drawings in which:

Fig. 1 is a diagrammatic view of the entire apparatus,
Fig. 2 is a schematic and diagrammatic view of one form of device for testing the apparatus, and
Fig. 3 shows another form of testing means.

In the diagram illustrated in Fig. 1, S designates the infrared source unit, C designates the gas cell unit having gas sample unit G connected thereto for introducing a gas sample to the apparatus, D designates a detector unit, and A and I depict a conventional amplifier unit and indicator unit, respectively. An analyzer testing unit T is connected to unit S for electrically testing the entire analyzer, and is hereinafter more fully described. As has been more fully described in my co-pending application, Serial No. 403,525, now Patent No. 2,802,109, unit S emits infrared radiation into unit C in two paths alternately; one path traversing a cell containing the gas to be analyzed as introduced by unit G, and the other path traversing a cell containing a comparison gas. The gas is ordinarily continuously passed through the analysis cell, and affects the intensity of the beam being traversed therethrough. Unit D detects and measures the difference in intensity between the two beams traversing unit C, and converts this difference into a signal which is amplified in unit A and indicated at unit I.

Reference is now made to Figs. 2 and 3 showing in detail two forms of electrical means for testing the apparatus described above. Fig. 2 schematically shows unit S having a pair of infrared sources 1 and 2 connected in parallel to a 115 volt power supply through step-down transformer 3. Testing unit T comprises a multiple contact switch 4 connected in series with source 2 for modifying the voltage across the source. Switch 4 includes, as an illustration, three stationary contacts 6, 8 and 10 and movable contact 12. Contacts 8 and 10 are each connected to source 2 through different value resistors 14 and 16, respectively. It should be readily seen that if source 2 is connected through contacts 6 and 12 of switch 4, no additional resistance is placed in series with the source. If, on the other hand, source 2 is connected through either resistors 14 or 16 by either contacts 8 or 10 and contact 12, the voltage across source 2 will be modified by the value of the particular resistor. That is, as the resistance is increased in the circuit source 2, the intensity of radiation from source 2 will be decreased. This variation in source radiation electrically simulates the effect produced by a known gas sample flowing in unit C and indicated at unit I. It is, of course, understood that precalibration of the analyzer predetermines what readings are required on the indicator when resistors 14 and 16 are switched into the circuit of source 2. Should the indicator fail to give the proper reading, it will then be obvious that one of the units of the apparatus is defective for one reason or another. If the analyzer is shown to be defective, then each unit of the analyzer can be checked and necessary repairs made. It is thus seen that a simple, yet accurate, testing means is provided for the analyzer whereby the complete analyzer may be quickly checked for operational efficiency prior to using the device at any given time. The number of switch contacts with their respective resistors is dependent upon the number of readings desired at various points on the scale of the indicator.

Since this invention deals with infrared sources, each generally having a resistance of about 2 ohms, and it is usually undesirable to reduce the beam intensity more than about 10%, the largest resistor used in switch 4 should not be greater than .2 of an ohm. Switch 4, however, when closed, inherently offers a resistance between its contacts, which may vary slightly with time and hence would affect the accuracy of the analyzer. Such switch resistance may still be further disadvantageously varied or increased by contamination, corrosion or other such changes that take place on the switch contacts. Accordingly, another form of testing unit T is shown in Fig. 3 for modifying the infrared source in a manner whereby the small resistance source can be accurately and reproducibly varied without encountering trouble due to switch contact resistance variations.

In Fig. 3, a step-down transformer 20 is in series opposition with the circuit comprising transformer 3 and source 2 to supply a bucking voltage to reduce or increase the voltage at source 2. Switch 14 is interposed in the 115 volt power supply line of transformer 20 to vary the output voltage thereof. Switch 14 comprises stationary contacts 22, 24 and 26 and movable contact 28. Resistors 30 and 32 are connected between contacts 22, 24 and 26 for adjusting the voltage to transformer 20. Accordingly, the amount of bucking voltage available in the source circuit is dependent upon the position of contact 28 with respect to either contact 22, 24 or 26, which in turn, varies the voltage applied to the infrared source. In this manner, the intensity of the infrared source 2 may be changed and this change is reflected on the indicator 1 to determine whether the analyzer is operating properly. The phase of transformer 20 determines whether the output voltage of transformer 20 adds to or subtracts from the voltage at the output of transformer 3 for varying the voltage across source 2. By utilizing this type of electrical means, the switch contact resistance changes cause negligible changes in the voltage applied to source 2. Whereas, in the testing device shown in Fig. 2, the resistance changes are directly reflected against source 2. Thus, the above-mentioned disadvantages of using purely a switch type electrical device for modifying the intensity of the infrared source is overcome.

Having explained the principle of the present invention and having illustrated and described what is considered to be several of the best embodiments, it is to be understood that, within the scope of the appended claims, the invention may be practiced otherwise than as specifically illustrated and described.

I claim:

1. In an infrared analyzer for the analysis of fluids and of the type having at least two sources of infrared radiation, a cell means for containing an analysis fluid, a means for measuring radiation, and a means for indicating the measured radiation; that method of testing the operational efficiency of said analyzer after it has been once calibrated with a known fluid sample, comprising the steps of (a) varying the voltage to one of said sources while the analyzer is still calibrated to obtain a change in indicator reading due to the voltage variation alone, (b) subsequently repeating step (a) when the operational efficiency is not known and comparing the resulting change in indicator reading with that obtained in step (a) whereby if the readings are the same the instrument is still operable and properly calibrated.

2. The method of claim 1 and, the voltage to one of said sources in step (a) is varied independently of any output signal producible by the analyzer.

References Cited in the file of this patent

UNITED STATES PATENTS

| | | |
|---|---|---|
| 2,167,802 | Goldfield | Aug. 1, 1939 |
| 2,339,053 | Coleman | Jan. 11, 1944 |
| 2,594,514 | Sweet | Apr. 29, 1952 |
| 2,621,297 | Obermaier | Dec. 9, 1952 |
| 2,669,662 | Lundahl | Feb. 16, 1954 |
| 2,718,597 | Heigl et al. | Sept. 20, 1955 |
| 2,741,703 | Munday | Apr. 10, 1956 |
| 2,775,160 | Foskett et al. | Dec. 25, 1956 |
| 2,834,246 | Foskett et al. | May 13, 1958 |
| 2,874,298 | Kindred | Feb. 17, 1959 |